United States Patent [19]

Toeniskoetter et al.

[11] 4,089,692
[45] May 16, 1978

[54] SETTABLE COMPOSITION CONTAINING ALUMINUM PHOSPHATE AND METHOD FOR PREPARING SAME

[75] Inventors: Richard H. Toeniskoetter, Worthington; John J. Spiwak, Columbus, both of Ohio

[73] Assignee: Ashland Oil, Inc., Ashland, Ky.

[21] Appl. No.: 588,121

[22] Filed: Jun. 18, 1975

Related U.S. Application Data

[63] Continuation-in-part of Ser. No. 455,474, Mar. 27, 1974.

[51] Int. Cl.² .............................................. B28B 7/34
[52] U.S. Cl. .............................. 106/38.35; 106/38.3; 106/38.9; 106/85; 106/286
[58] Field of Search ..................... 106/38.3, 38.35, 286, 106/38.9, 85

[56] References Cited

U.S. PATENT DOCUMENTS

| 2,116,910 | 5/1938 | Piccard | 106/85 |
|---|---|---|---|
| 2,450,952 | 12/1948 | Greger | 106/121 |
| 2,522,548 | 9/1950 | Streicher | 106/38.9 |
| 2,690,377 | 9/1954 | Lefforge et al. | 423/275 |
| 3,316,110 | 4/1967 | Herbst et al. | 264/63 |
| 3,511,674 | 5/1970 | Harris et al. | 264/61 |
| 3,746,557 | 7/1973 | Shimazaki et al. | 106/65 |

*Primary Examiner*—Lorenzo B. Hayes

[57] ABSTRACT

Settable composition comprising aluminum phosphate, solid organic carboxylic acid, water, and material containing an alkaline earth metal and an oxide, and being obtained by providing an admixture of the above constituents whereby the solid organic carboxylic acid and alkaline earth material are not precontacted with each other prior to contact of the material containing an alkaline earth material with the aluminum phosphate, and process for preparing same are provided.

34 Claims, No Drawings

SETTABLE COMPOSITION CONTAINING ALUMINUM PHOSPHATE AND METHOD FOR PREPARING SAME

CROSS-REFERENCES TO RELATED APPLICATIONS

The present application is a continuation-in-part of copending application Ser. No. 455,474 filed Mar. 27, 1974 and entitled "Binder Composition Containing Alcohols".

BACKGROUND OF THE INVENTION

The present invention relates to curable or settable compositions, method of preparing the compositions, and methods for curing the compositions.

The present invention is particularly useful in obtaining molding compositions such as refractories, abrasive articles, and molding shapes such as foundry cores and molds.

Certain inorganic materials have been suggested as the major component in curable compositions for various uses including molding compositions. However, various prior art binders from inorganic substances have suffered from one or more deficiencies. Typical of the deficiencies exhibited by prior art inorganic binders including the silicates suggested for molding shapes such as cores and molds have been poor collapsibility of the shape and poor removal or "shake out" of the molding shape from the metal casting.

Also, many of the suggested inorganic binders exhibit inadequate bonding strength properties and/or undesirable cure characteristics.

Moreover, various prior art inorganic binders such as the silicates provide molding shapes and particularly ambient temperature cured shapes which possess poor scratch resistance at strip; and accordingly, such shapes require at least a few additional hours after strip time has been achieved to develop adequate scratch resistance. In view of the poor scratch resistance at strip, such shapes cannot be readily handled at strip because of the danger of damage to the shape. Moreover, the sag resistance at strip of the shapes prepared from various prior art binders is not good.

Another problem which may exist is the degradation of physical properties such as tensile strength and hardness of molded articles after storage for only a few hours.

It is therefore an object of the present invention to provide curable inorganic systems which possess acceptable strength characteristics.

It is another object of the present invention to provide curable inorganic systems wherein the cure characteristics can be manipulated within certain limits.

It is a further object of the present invention to provide settable inorganic binder systems for molding shapes which possess relatively good collapsibility and shake out properties as compared to various other suggested inorganic binders.

It is another object of the present invention to provide molding shapes employing inorganic binders which possess good scratch and sag resistance at strip. Likewise, it is an object of the present invention to provide molding shapes from inorganic binder systems which can be readily and easily handled at strip.

It is also an object of the present invention to provide molded articles which demonstrate improved resistance to deterioration of physical properties such as tensile strength and hardness due to storage.

SUMMARY OF THE INVENTION

One aspect of the present invention is concerned with a process for preparing settable composition which comprises:
A. providing aluminum phosphate;
B. providing solid organic carboxylic acid;
C. providing alkaline earth material;
D. providing water; and
E. providing an admixture of the aluminum phosphate; the solid organic carboxylic acid, the alkaline earth material, and water provided that the solid organic carboxylic acid and alkaline earth material are not precontacted with each other prior to contact of the alkaline earth material with the aluminum phosphate; and wherein
F. the aluminum phosphate contains 0 to about 40 mole % of boron based upon the moles of aluminum and contains a mole ratio of phosphorus to total moles of aluminum and boron of at least about 2:1;
G. said solid organic carboxylic acid being soluble in aqueous solutions of the aluminum phosphate and containing at least two substituents being either at least carboxylic groups or at least one carboxylic group and at least one hydroxyl group; or keto tautomers thereof;
H. said alkaline earth metal material contains alkaline earth metal and an oxide.

The amount of aluminum phosphate is from about 50 to about 95% by weight based upon the total weight of aluminum phosphate and alkaline earth material; and the amounts of alkaline earth material is from about 50 to about 5% by weight based upon the total weight of aluminum phosphate and alkaline earth material. The amount of water is from about 15 to about 50% by weight based upon the total weight of aluminum phosphate and water. The amount of the solid carboxylic acid is from about 0.5 to about 25% by weight based upon the total weight of aluminum phosphate and solid organic carboxylic acid.

The present invention is also directed to settable composition comprising:
A. aluminum phosphate containing 0 to about 40 mole % of boron based upon the moles of aluminum and containing a mole ratio of phosphorus to total moles of aluminum and boron of at least about 2:1;
B. solid organic carboxylic acid being soluble in aqueous solutions of the aluminum phosphate and containing at least two substituents selected from the group consisting of at least two carboxylic acid groups; and at least one carboxylic acid group and at least one hydroxyl group; or keto tautomers thereof;
C. alkaline earth material containing alkaline earth metal and an oxide; and
D. water; and wherein the amount of the alkaline earth material is from about 50 to about 5% by weight based upon the total weight of the aluminum phosphate and alkaline earth material; the amount of the aluminum phosphate is from about 95 to about 50% by weight based upon the total weight of the aluminum phosphate and alkaline earth material; the amount of water is from about 15 to about 50% by weight based upon the total weight of the aluminum phosphate and water; and the amount of the solid organic carboxylic acid is from about 0.5 to about 25% by weight based upon the total weight of aluminum phosphate and the organic carboxylic acid; and wherein the composition is obtained by providing an admixture of the aluminum phosphate, the solid organic carboxylic acid, the alkaline earth material, and water whereby the solid organic carboxylic acid and alkaline earth material are not precontacted with each other prior to contact of the alkaline earth material with the aluminum phosphate.

Another aspect of the present invention is a two-package system capable of curing at ambient temperature consisting essentially of containing in a first package a curable composition of:

A. aluminum phosphate containing 0 to about 40 mole % of boron based upon the moles of aluminum and containing a mole ratio of phosphorus to total moles of aluminum and boron of at least about 2:1;

B. solid organic carboxylic acid being soluble in aqueous solutions of the aluminum phosphate and containing at least two substituents being at least two carboxylic acid groups; or at least one carboxylic acid and at least one hydroxyl group; or keto tautomers thereof; and C. water; wherein the amount of aluminum phosphate is from about 50 to about 85% by weight based upon the total weight of aluminum phosphate and water; the amount of water is from about 15 to about 50% by weight based upon the total weight of the aluminum phosphate and water; and the amount of the solid organic carboxylic acid is from about 0.5 to about 25% by weight based upon the total weight of aluminum phosphate and acid; and containing in a second package a hardening agent for the curable composition in the first package and being an alkaline earth material containing alkaline earth metal and an oxide wherein the amount of the alkaline earth material is from about 50 to about 5% by weight based upon the total weight of the aluminum phosphate and alkaline earth material.

The present invention is also concerned with the fabrication of molded articles such as refractories, abrasive articles such as grinding wheels and shapes used for molding which includes providing a major amount of aggregate in admixture with an effective bonding amount up to about 40% by weight of the aggregate of the settable composition defined above.

The present invention is also concerned with a process for casting a relatively low melting point nonferrous type metal which comprises fabricating a shape as defined above; pouring the relatively low melting point nonferrous type metal while in the liquid state into the shape; allowing the nonferrous type metal to cool and solidify; then contacting the shape with water in an amount and for a time sufficient to cause degradation of the bonding characteristics of the binder system; and separating the molded article.

DESCRIPTION OF THE PREFERRED EMBODIMENTS

The present invention can be achieved by admixing the aluminum phosphate, the solid organic carboxylic acid, the alkaline earth material, and the water in any suitable manner and in any sequence provided that the solid organic carboxylic acid and the alkaline earth material are not precontacted with each other prior to contact of the alkaline earth material with the aluminum phosphate.

Precontacting of the solid organic carboxylic acid and alkaline earth material greatly reduces the reactivity between the alkaline earth material and aluminum phosphate, which reactivity is essential in achieving the type of curing characteristics which are desired in accordance with the present invention.

The preferred means of practicing the present invention is to provide an aqueous solution of the aluminum phosphate material and water followed by addition of the solid organic carboxylic acid per se or as an aqueous solution to the aqueous solution of the aluminum phosphate. Next, the alkaline earth material can be contacted with the aqueous solution of the aluminum phosphate material, water, and solid organic carboxylic acid.

At the present time, it is contemplated that the present invention be carried out by making the compositions available as a two-package system comprising the aluminum phosphate, solid organic carboxylic acid, and water components in a first package and the alkaline earth metal component in a second package. For instance, when the compositions are to be employed along with an aggregate, the contents of the package containing the alkaline earth metal component are usually admixed with the aggregate, and then the contents of the aluminum phosphate containing package are admixed with the aggregate and alkaline earth metal component composition. After a uniform distribution of the curable system on the particles of aggregate has been obtained, the resulting mix is molded into the desired shape. Methods of distributing the binder on the aggregate particles are well known to those skilled in the art. The mix can, optionally, contain other ingredients such as iron oxide, ground flax fibers, wood cereals, clay, pitch, refractory flours and the like.

The present invention can be carried out by methods such as adding the aluminum phosphate and the solid organic carboxylic acid separately and preferably as aqueous solutions to the alkaline earth material at substantially the same time, or by admixing the alkaline earth metal material and aluminum phosphate first, followed shortly thereafter and before substantial reaction occurs between the aluminum phosphate and alkaline earth metal material by admixing with the solid organic carboxylic acid.

In addition, when the compositions are to be employed along with an aggregate, the alkaline earth metal component can be admixed with the aggregate, and then the aluminum phosphate preferably as an aqueous solution is admixed with the aggregate and alkaline earth metal component composition substantially simultaneously with or shortly prior to the admixing of the organic carboxylic acid with the aggregate composition.

Also, it may be desirable to first admix the aluminum phosphate and organic carboxylic acid with the aggregate, and then admix the alkaline earth material with the aggregate composition or to first admix either the aluminum phosphate or organic carboxylic acid with the aggregate and then admix the other of the aluminum phosphate or organic carboxylic acid which was not previously admixed prior to or substantially simultaneously with admixing of the alkaline earth material with the aggregate composition.

The aluminum phosphate constituent of the curable system of the present invention is an aluminum phosphate which can contain boron in an amount up to about 40 mole % based upon the moles of aluminum of the aluminum phosphate. Also, the aluminum phosphate contains a mole ratio of phosphorus to total moles of aluminum and boron of at least about 2:1, usually from about 2:1 to about 7:1, and preferably from about 2.5:1 to about 3.5:1 and more preferably from about 2.8:1 to about 3.2:1.

Any of the several known methods may be employed to produce an aluminum phosphate suitable for the present purposes. In particular those methods wherein the aluminum oxide containing reactant is completely dissolved are preferred.

The aluminum phosphate also is preferably prepared from either $P_2O_5$ or concentrated phosphoric acid of from about 70 to about 86% by weight $H_3PO_4$ concentration. The preferred phosphoric acid solutions contain about 80 to about 86% by weight of $H_3PO_4$. Of course, other sources of phosphorus such as polyphosphoric acids, can be employed, if desired.

The amount of aluminum phosphate employed in the curable or settable system is from about 50 to about 95% by weight and preferably from about 65 to about 90% by weight based upon the total weight of aluminum phosphate and alkaline earth material, and the amount of alkaline earth material is from about 5 to about 50% and preferably from about 10 to about 35% by weight based upon the total weight of aluminum phosphate and alkaline earth material.

The preferred aluminum phosphates employed in the present invention contain boron. Usually the boronated aluminum phosphates are prepared from boric acid and/or boric oxide and/or metallic borates such as alkali metal borates which include sodium borate ($Na_2B_4O_7 \cdot 10H_2O$). These preferred aluminum phosphates are preferably, but not necessarily, prepared by reacting together the phosphoric acid or $P_2O_5$; and alumina such as alumina trihydrate ($Al_2O_3 \cdot 3H_2O$); and boric acid or boric oxide. It is preferred to use boric acid rather than boric oxide since the acid is in a more usable form than the oxide because of its greater solubility in the reaction system as compared to the oxide.

Since the reaction is exothermic, it can generally proceed by merely admixing the reactants and permitting the exotherm to raise the temperature of the reaction mass until the exotherm peaks, usually at about 200° to 230° F. After the exotherm peaks, it may be advantageous to apply external heat for about ½ to 2 hours to maintain a maximum reaction temperature between about 220 and about 250 to ensure completion of the reaction. Also, in some instances it may be desirable to initiate the reaction by applying external heat just until the exotherm begins.

The reaction is generally carried out at atmospheric pressure. However, higher or lower pressures can be employed if desired. In addition, the reaction is generally completed within about 1 to about 4 hours and more usually from about 2 to about 3 hours.

The preferred aluminum phosphates contain from about 3 to about 40 mole % of boron based upon the moles of aluminum. The more preferred quantity of boron is between about 5 and about 30 mole % while the most preferred quantity is between about 10 and about 25 mole % based upon the moles of aluminum.

Those aluminum phosphates which contain the boron are preferred because of improved tensile strength achieved in the final cured molded articles. The increased tensile strength is even evident at the lower quantity of boron such as at 3 mole %.

In addition, the modification with boron is extremely advantageous since it alters the reactivity of the aluminum phosphate with the alkaline earth material in the presence of aggregate. As the level of boron in the aluminum phosphate increases, the rate of reaction with the alkaline earth material in the presence of aggregate decreases. This is particularly noticeable at boron concentrations of at least about 10 mole % based upon the moles of aluminum. Therefore, the boron modification aspect of the present invention makes it possible to readily manipulate the cure characteristics of the binder system so as to tailor the binder within certain limits, to meet the requirements for a particular application of the binder composition.

The alteration in the cure characteristics and particularly with the free alkaline earth oxide; however, has not been observed in the absence of aggregate such as sand. This may be due to the exothermic nature of the reaction between the aluminum phosphate and free alkaline earth metal oxide whereby the presence of aggregate acts as a heat sink reducing the reactivity to a level where the effect of the boron modification becomes noticeable. On the other hand, the reaction is so fast in the absence of aggregate that any effect which the boron may have on cure is not detectable and, even if detectable, it is of no practical value.

In addition, the boron modification provides aluminum phosphate water solutions which exhibit greatly increased shelf stability as compared to unmodified aluminum phosphate materials. The enhanced shelf stability becomes quite significant when employing quantities of boron of at least about 5 mole % based upon the moles of aluminum.

Moreover, the use of the solid organic carboxylic acid is most effective when boronated aluminum phosphates are used. In particular, the effectiveness of the organic carboxylic acid on improving the stability of physical properties of cured molded articles is increased when using boronated aluminum phosphates, and especially when using the larger quantities of boron such as from about 10 to about 30 mole % based upon the moles of aluminum. Moreover, the effect of the organic carboxylic acid has been quite noticeable when binder-aggregate compositions have been baked such as at about 300°-350° F for up to about 30 minutes.

The organic carboxylic acids employed according to the present invention are solid at normal room temperatures (i.e., the normal or usual form in which the acids exist is as a solid) and are soluble in aqueous solutions of the aluminum phosphate. In addition, the organic carboxylic acids contain at least two "functional" substituents being either at least two carboxylic acid groups or at least one carboxylic acid group and at least one hydroxyl group, or a keto tautomer thereof.

The organic carboxylic acids usually contain from about 2 to about 20 of such "functional" substituents or groups and preferably from about 2 to about 10 of such "functional" substituents or groups in the molecule. In addition, these substances employed according to the present invention generally contain 2 to about 20 carbon atoms and preferably from about 2 to about 10 carbon atoms. In addition, the organic carboxylic acids can contain other groups or atoms which do not adversely affect the function of the material in the compositions of the present invention to an undesirable extent.

For instance, the organic carboxylic acids employed in the present invention can contain moieties. Also, the organic carboxylic acids are generally nonpolymeric, saturated aliphatic carboxylic acids. In addition, many of the organic carboxylic acids employed in this invention contain at least two adjacent carbon atoms each having directly attached thereto a carboxylic acid or hydroxyl group. Examples of some suitable organic carboxylic acids include lactic acid, tartaric acid, citric acid, oxalic acid, malonic acid, and gluconic acid. The preferred acid is tartaric acid.

The amount of organic carboxylic acid employed in the present invention is usually from about 0.5 to about 25% by weight and preferably from about 2 to about 15% by weight based upon the total weight of the aluminum phosphate and alcohol.

Although certain carboxylic acids have apparently been suggested in certain inorganic compositions, the present invention including various advantages achieved thereby are neither suggested by nor apparent from these prior suggestions of employing carboxylic acids.

For instance, in U.S. Pat. No. 2,450,952 to Gregor on column 5, line 6 et seq, it is stated:

"The properties of the aluminum phosphates vary with the $Al_2O_3$ to $P_2O_5$ ratio. For practical purposes, the range of 1 to 1.64 moles of $Al_2O_3$ to 3 moles of $P_2O_5$ is of principal interest. Adjustments and allowances must be made for the lower reactivity in the higher alumina ranges up to the dialuminum phosphates, either by using a chemically very active filler or by causing an increased acidity and solubility by the addition of a solid organic acid in small quantities such as ½% of oxalic or tartaric acid."

The reason for employing the acid according to the above disclosure of Gregor would not be applicable in the present invention since the aluminum phosphate employed in the present invention contains a minimum of moles of phosphorus to aluminum and boron of about 2:1 (i.e., maximum moles of aluminum to phosphorus being about 1.5 moles per 3 moles of phosphorus).

On the other hand, Gregor seemingly does not contemplate using nor needing the acid until the aluminum is present in amounts exceeding about 1.64 moles per 3 moles of phosphorus and up to about 2 moles per 3 moles of phosphorus to the dialuminum phosphate. This difference is believed in part to be due to the differences in relative amounts of aluminum phosphate and magnesium compound employed by Gregor.

Contrary to the disclosure of Gregor of accelerating cure, U.S. Pat. No. 2,345,211 to Neiman suggests on column 3, lines 47-51:

"The use of organic acids and temporary binders, such as gelatin, is not recommended but may be used where certain effects, such as slower setting time, is desired."

However, the advantages achieved by the present invention are not suggested by Neiman, and a review of Neiman illustrates that such is directed to compositions quite different from that of the present invention.

U.S. Pat. No. 3,511,674 to Harris et al suggests pretreating calcium silicate with certain acids to stabilize it against immediate reaction with monoaluminum phosphate. This is contrary to the manner in which the present invention is carried out. Moreover, the various advantages achieved by the present invention are not suggested by Harris et al. Moreover, the compositions of Harris et al in addition to the differences in the manner in which the acid is employed, differ from the present invention in various aspects such as the relative amount of the aluminum phosphate and calcium silicate. Also, when the present aspect of the present invention of using a boronated aluminum phosphate is being followed, the need for stabilizing calcium silicate is not even existent in view of the relatively low reactivity between calcium silicate and boronated aluminum phosphates.

On page 3, line 24 et seq., of British patent application 23885/72, it is stated:

"Normal aluminum orthophosphate is insoluble in water but soluble in dilute mineral acids (for example, hydrochloric acid and nitric acids) and in some carboxylic acids (for example, citric acid) and. . . ."

The reason for employing the acid according to the above disclosure of British application 23885/72 would not be applicable in the present invention since normal aluminum orthophosphate refers to aluminum phosphate from a mole ratio of phosphorus to aluminum of 1:1. Contrary to this, the present invention is concerned with aluminum phosphates which are from a minimum mole ratio of phosphorus to aluminum and boron of 2:1 and accordingly are not water insoluble. For a suggestion of complexes of the anion of a carboxylic acid containing aluminum and phosphorus in a ratio of 1:1, see British patent application 3174/73 (i.e., page 4, lines 9-15).

U.S. Pat. No. 2,690,377 to Leffarge et al discusses the addition of oxalic acid instead of boric acid to aluminum phosphate (see column 4, lines 21-49, but such did not accomplish the results desired by them of stabilizing the aluminum hydrogen phosphate solution against crystallization.

The alkaline earth metal material employed in the present invention is any material containing an alkaline earth metal and containing an oxide which is capable of reacting with the aluminum phosphate. When the alkaline earth metal material is a free alkaline earth metal oxide or a free alkaline earth metal hydroxide, it preferably has a surface area no greater than about 8.5 $m^2$/gram as measured by the BET procedure. More preferably it has a surface area no greater than about 3 $m^2$/gram. Those free oxides and free hydroxides having surface areas no greater than about 8.5 $m^2$/gram are preferred when the compositions are employed in molding compositions such as for preparing refractories, abrasive articles and particularly for making shapes such as foundry cores and molds.

It has been observed that compositions of the present invention which employ the preferred oxides and hydroxides have sufficient work times to be adequately mixed in the more conventional types of commercially available batch type mixers before introduction into the mold or pattern for shaping. Although free oxides and free hydroxides having surface areas greater than about 8.5 $m^2$/gram generally are too reactive for use with the more conventional types of commercially available batch type mixers, they are suitable when much faster mixing operations are employed such as those continuous mixing operations which may require only about 20 seconds for adequate mixing or when the binders are to be employed for purposes wherein substantially instantaneous cure is desirable and/or can be tolerated.

Those materials which contain an oxide or hydroxide and an alkaline earth metal, in chemical or physical combination with other constituents are less reactive than the free oxides and hydroxides. Accordingly, such materials can have surface areas greater than about 8.5 $m^2$/gram and be suitable for use even when employing mixing operations which require about 2 to 4 minutes or more.

These other constituents may be present such as being chemically combined with the oxide and alkaline earth metal and/or being physically combined such as by sorption or in the form of an exterior coating. However, the mere mixing of a material with a free oxide or hydroxide without achieving the above type of uniting of the material would not materially reduce the reactivity. Therefore, such mere mixing is not included within the meaning of chemical or physical combinations as used herein.

However, it is preferred that all of the alkaline earth metal materials employed in the present invention have a surface area of no greater than about 8.5 $m^2$/gram and more preferably have a surface area of no greater than about 3 $m^2$/gram. Usually the surface areas are at least about 0.01 $m^2$/gram. All references to surface area unless the contrary is stated, refer to measurements by the BET procedure as set forth in tentative ASTM-D-3037-71T method C-Nitrogen-Absorption Surface Area by Continuous Flow Chromatography, Part 28, page 1106, 1972 Edition, employing 0.1 to 0.5 grams of the alkaline earth material.

Included among the suitable materials are calcium oxides, magnesium oxides, calcium silicates, calcium aluminates, calcium aluminum silicates, magnesium silicates, and magnesium aluminates. Also included among the suitable materials of the present invention are the zirconates, borates, and titanates of the alkaline earth metals.

It is preferred to employ either a free alkaline earth metal oxide or a mixture of a free alkaline earth metal oxide and a material which contains the alkaline earth metal and oxide in combination with another constituent such as calcium aluminates. In addition, the preferred alkaline earth metal oxides are the magnesium oxides.

Those materials which include components in combination with the oxide or hydroxide, and the alkaline earth metal, in some instances can be considered as being a latent source of the alkaline earth metal oxide for introducing the alkaline earth metal oxide into the binder system.

Some suitable magnesium oxide materials are available under the trade designations of Magmaster 1-A from Michigan Chemical, Calcined Magnesium Oxide, −325 mesh, Cat. No. M-1016 from Cerac/Pure, Inc.; H-W Periklase Grain 94C Grade (Super Ball Mill Fines); H-W Periklase Grain 94C Grade (Regular Ball Mill Fines); and H-W Periklase Grain 98, (Super Ball Mill Fines) from Harbison-Walker Refractories. Magmaster 1-A has a surface area of about 2.3 $m^2$/gram and Cat. No. M-1016 has a surface area of about 1.4 $m^2$/gram.

A particularly preferred calcium silicate is Wollastonite which is a particularly pure mineral in which the ratio of calcium oxide to silica is substantially equal molar.

Generally commercially available calcium aluminate compositions contain from about 15 to about 40% by weight of calcium oxide and from about 35 to about 80% by weight of alumina, with the sum of the calcium oxide and alumina being at least 70% by weight. Of course, it may be desirable to obtain calcium aluminate compositions which contain greater percentages of the calcium oxide. In fact, calcium aluminates containing up to about 45.5% by weight of calcium oxide have been obtained. Some suitable calcium aluminate materials can be obtained commercially under the trade designations Secar 250 and Fondu from Lone Star Lafarge Company, Lumnite and Refcon from Universal Atlas Cement and Alcoa Calcium Aluminate Cement CA-25 from Aluminum Company of America. Fondu has a minimum surface area as measured by ASTM C115 of about 0.15 $m^2$/gram and 0.265 $m^2$/gram as measured by ASTM C205. Lumnite has a Wagner specific surface of 0.17 $m^2$/gram and Refcon has a Wagner specific surface of 0.19 $m^2$/gram.

Mixtures of a free alkaline earth metal oxide and a material containing components in combination with the free oxide or hydroxide and alkaline earth metal preferably contain from about 1 part by weight to about 10 parts and more preferably from about 2 to about 8 parts by weight of the free alkaline earth metal oxide per part by weight of the material containing substituents in combination with the free metal oxide or hydroxide and alkaline earth metal. Preferably such mixtures are of magnesium oxides and calcium aluminates. The free alkaline earth metal oxide such as magnesium oxides in such mixtures are primarily responsible for achieving fast cure rates while the other component such as the calcium aluminates are mainly responsible for improving the strength characteristics of the final shaped article. Since the free metal oxide is a much more reactive material than those materials which are latent sources of the free metal oxide, those other materials will only have a minimal effect upon the cure rate when in admixture with the alkaline earth metal oxide.

Sometimes it may be desirable to employ the alkaline earth metal materials in the form of a slurry or suspension in a diluent primarily to facilitate material handling. Examples of some suitable liquid diluents include alcohols such as ethylene glycol, furfuryl alcohol, esters such as cellosolve acetate, and hydrocarbons such as kerosene, mineral spirits (odorless), mineral spirits regular, and 140 Solvent available from Ashland Oil, Inc., and Shellflex 131 from Shell Oil, and aromatic hydrocarbons commercially available under the trade designations Hi-Sol 4-2 and Hi-Sol 10 from Ashland Oil, Inc. Of course, mixtures of different diluents can be employed, if desired. In addition, it may be desirable to add a suspending agent to slurries of the alkaline earth material such as Bentone, Cabosil, and Carbopol in amounts up to about 10% and generally up to less than 5% to assist in stabilizing the slurry or suspension in the diluent.

Generally the alkaline earth metal material and diluent are mixed in a weight ratio of about 1:3 to about 3:1 and preferably from about 1:2 to about 2:1. It has been observed that the nonpolar hydrocarbons provide the best strength characteristics as compared to the other diluents which have been tested, when a diluent is employed. In addition, the alcohols such as ethylene glycol and furfuryl alcohol are advantageous as liquid diluents since they increase the work time of the foundry mix without a corresponding percentage increase in the strip time. However, the strength properties of the final foundry shape are somewhat reduced when employing alcohols such as ethylene glycol and furfuryl alcohol.

The other necessary component of the binder system employed in the present invention is water. All or a portion of the water can be supplied to the system as the carrier for the aluminum phosphate material. Also, the water can be introduced as a separate ingredient. Of course, the desired quantity of water can be incorporated in part as the water in the aluminum phosphate and in part from another source. The amount of water employed is from about 15 to about 50% by weight and preferably from about 20 to about 40% by weight based upon the total weight of the aluminum phosphate and water.

The present invention makes possible the obtaining of molded articles including abrasive articles such as grinding wheels, shapes for molding and refractories such as ceramics having improved resistance to deterioration of physical properties such as tensile strength and hardness due to storage. The loss in such physical properties after storage for several hours (i.e., 24 hours or more) is less when employing the composition of this invention as compared to employing compositions which differ only in not including a solid organic carboxylic acid of the type employed in the present invention. The improvement in the stability of physical properties of the cured articles such as molds and cores is most pronounced when the aluminum phosphate is a boronated aluminum phosphate. The effect of the solid organic carboxylic acid is much greater when a boronated aluminum phosphate is used instead of a non-boronated aluminum phosphate.

In addition, it has been observed that the presence of the solid organic carboxylic acid in the composition of the present invention improves the flowability of mixtures of the composition and aggregate for molding operations.

It has further been observed that the surface finishes of articles cast in molds or cores prepared from compositions of the present invention are improved as compared to compositions which do not contain the solid organic carboxylic acid constituent. It has further been observed that the solid organic carboxylic acids in the amounts employed increase both the work and strip times of molding compositions.

Also, other materials which do not adversely affect the interrelationship between the aluminum phosphate, solid organic carboxylic acid, alkaline earth metal component, and water can be employed, when desired.

When the composition of the present invention is used in molding compositions such as for preparing abrasive articles including grinding wheels, refractories including ceramics and structures for molding such as ordinary sand type foundry shapes and precision casting shapes, aggregate is employed along with the compositions.

When preparing an ordinary sand type foundry shape, the aggregate employed has a particle size large enough to provide sufficient porosity in the foundry shape to permit escape of volatiles from the shape during the casting operation. The term "ordinary sand type foundry shapes" as used herein refers to foundry shapes which have sufficient porosity to permit escape of volatiles from it during the casting operation. Generally, at least about 80% and preferably at least about 90% by weight of aggregate employed for foundry shapes has an average particle size no smaller than about 150 mesh (Tyler Screen Mesh). The aggregate for foundry shapes preferably has an average particle size between about 50 and about 150 mesh (Tyler Screen Mesh). The preferred aggregate employed for ordinary foundry shapes is silica wherein at least about 70 weight % and preferably at least about 85 weight % of the sand is silica. Other suitable aggregate materials include zircon, olivine, alumino-silicate sand, chromite sand, and the like.

When preparing a shape for precision casting, the predominate portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and aluminosilicate sands.

Shapes for precision casting differ from ordinary sand type foundry shapes in that the aggregate in shapes for precision casting can be more densely packed than the aggregate in shapes for ordinary sand type foundry shapes. Therefore, shapes for precision casting must be heated before being utilized to drive off volatilizable material, present in the molding composition. If the volatiles are not removed from a precision casting shape before use, vapor created during casting will diffuse into the molten metal since the shape has a relatively low porosity. The vapor diffusion would decrease the smoothness of the surface of the precision cast article.

When preparing a refractory such as a ceramic, the predominant portion and at least about 80 weight % of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1500° F which are needed to cause sintering for utilization. Examples of some suitable aggregates employed for preparing refractories include the ceramics such as refractory oxides, carbides, nitrides, and silicides such as aluminum oxide, lead oxide, chromic oxide, zirconium oxide, silica, silicon carbide, titanium nitride, molybdenum disilicide, and carbonaceous material such as graphite. Mixtures of the aggregates can also be used, when desired, including mixtures of metals and the ceramics.

Examples of some abrasive grains for preparing abrasive articles include aluminum oxide, silicon carbide, boron carbide, corundum, garnet, emery, and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic fillers can be employed along with the abrasive grit in preparing abrasive articles. It is preferred that at least about 85% of the inorganic fillers have average particle size no greater than 200 mesh. It is most preferred that at least about 95% of the inorganic filler has an average particle size no greater than 200 mesh. Some inorganic fillers include cryolite, fluorospar, silica and the like. When an inorganic filler is employed along with the abrasive grit, it is generally present in an amount from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate. Such moisture present on the aggregate can be compensated for, by altering the quantity of water added to the composition along with the other components such as the aluminum phosphate, solid organic carboxylic acid and alkaline earth metal material.

In molding composition, the aggregate constitutes the major constituent and the binder constitutes a relatively minor amount. In ordinary sand type foundry applications, the amount of binder is generally no greater than about 10% by weight and frequently within the range of about 0.5 to about 7% by weight, based upon the weight of the aggregate. Most often, the binder content ranges from about 1 to about 5% by weight based upon the weight of the aggregate in ordinary sand type foundry shapes.

In molds and cores for precision casting applications, the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

The systems of the present invention are capable of ambient temperature cure which is used herein to include curing by chemical reaction without the need of external heating means. However, within the general description of ambient temperature cure, there are a number of different ambient temperature curing mechanisms which can be employed. For example, ambient temperature cure encompasses both "air cure" and "no bake". Normally, ambient temperature cure is effected at temperatures of from about 50° F to about 120° F.

Moreover, the molding shapes of the present invention have good scratch resistance and sag resistance immediately at strip. Accordingly, the molding shapes of the present invention can be easily and readily handled and employed immediately after strip.

In addition, the systems of the present invention make possible the achievement of molding shapes which possess improved collapsibility and shake out of the shape when used for the casting of the relatively high melting point ferrous-type metals such as iron and steel which are poured at about 2500° F, as compared to other inorganic binder systems such as the silicates.

Furthermore, the systems of the present invention make possible the preparation of molding shapes which can be employed for the casting of the relatively low melting point nonferrous type metals such as aluminum, copper, and copper alloys including brass. The temperatures at which such metals are poured in certain instances may not be high enough to adequately degrade the bonding characteristics of the systems of the present invention to the extent necessary to provide the degree of collapsibility and shake out by simple mechanical forces which are usually desired in commercial type of applications.

However, the systems of the present invention make it possible to provide molding shapes which can be collapsed and shaken out from castings of the relatively low melting point nonferrous type metals and particularly aluminum, by water leaching. The shapes can be exposed to water such as by soaking or by a water spray. Moreover, it has been observed that the surface appearance of aluminum cast articles when employing shapes according to the present invention is quite good.

The systems of the present invention further make possible the achievement of molding shapes which can be successfully used for casting molten refractory particles in fused casting processes.

It has been also observed that with the systems of the present invention, it is possible to readily reclaim and reuse the aggregate employed in such applications as foundry cores and molds after destruction of the shape. In fact, sand aggregate has been successfully reclaimed and reused for at least seven cycles in foundry cores and molds.

When the compositions of the present invention are used to prepare ordinary sand type foundry shapes, the following steps are employed:

(1) forming a foundry mix containing an aggregate (e.g., sand) and the contents of the curable system;

(2) introducing the foundry mix into a mold or pattern to thereby obtain a green foundry shape;

(3) allowing the green foundry shape to remain in the mold or pattern for a time at least sufficient for the shape to obtain a minimum stripping strength (i.e., become self-supporting); and (4) thereafter removing the shape from the mold or pattern and allowing it to cure at room temperature, thereby obtaining a hard, solid, cured foundry shape.

In order to further understand the present invention the following nonlimiting examples concerned with foundry shapes are provided. All parts are by weight unless the contrary is stated. In all the examples, the samples are cured by no-bake procedure at room temperature unless the contrary is stated. The core hardness in the examples was measured on a No. 674 Core Hardness Tester commercially available from Harry W. Dietert Co., Detroit, Michigan.

EXAMPLE 1

To a round bottom, 3 liter, 3-necked reaction flask fitted with a heating mantle, mechanical stirrer, reflux condenser and thermometer are added 1650 parts of 85% phosphoric acid. Under mild agitation, 50 parts of granular boric acid are charged to yield a boric acid-phosphoric acid dispersion. The boric acid is added as a smooth steady "stream", as opposed to dumping in bulk, to avoid clumping. To the agitated dispersion are added 310 parts of hydrated alumina (Alcoa, C-33 grade) as a smooth steady stream to give a milky-white slurry.

The reaction mass is heated to a temperature of about 110°-120° F in about ½ hour at which time external heat is removed. The reaction is continued for about another 20 to 30 minutes with the temperature rising to a maximum of about 220°-230° F due to the reaction exotherm. Then external heat is applied and reaction temperature rises to a maximum of about 245°-250° F at which point refluxing occurs. The reaction mass is held at about 245°-250° F for about 1.5-2 hours to ensure complete reaction. The reaction mass is cooled to about 200° F in about 45 minutes at which time about 260 parts of water are slowly added with agitation. The temperature of the reaction mass then drops to about 150°-160° F. About 2270 parts of product are then collected in glass-line polypropylene containers. The product is a boronated aluminum phosphate product having a solids content of 66.6%, a viscosity of 700-750 centipoises, mole ratio of phosphorus to total moles of aluminum and boron of 3:1, and about 20 mole % boron based upon the moles of aluminum; a pH of 1.5–2.0 and Gardner color of 2.

5000 parts of Port Crescent sand and about 25 parts of a mixture of magnesium oxide having a surface area of about 2.3 m$^2$/gram (Magmaster 1-A) and Calcium Aluminate (Refcon) in a ratio of 5 parts of magnesium oxide to 1 part of calcium aluminate are admixed for about 2 minutes. To this mixture are added a mixture of about 158 parts of the boronated aluminum phosphate product prepared above and about 7 parts of gluconic acid. The mixture is then agitated for 2 minutes.

The resulting foundry mix is formed by hand ramming into standard AFS tensile strength samples using the standard procedure. The tensile strength of the test bars and core hardness are set forth in Table I below. The composition has a work time of about 19 minutes and a strip time of about 62 minutes.

EXAMPLE 2

Example 1 is repeated except that about 10.3 parts of gluconic acid and about 154.7 parts of the boronated aluminum phosphate are employed. The resulting foundry mix is formed into standard AFS tensile strength samples using the standard procedure. The tensile strength of the test bars and core hardness are set forth below in Table I. The composition has a work time of about 23 minutes and a strip time of about 58 minutes.

EXAMPLE 3

Example 1 is repeated except that about 16.5 parts of gluconic acid and about 148.5 parts of the boronated aluminum phosphate are employed. The resulting foundry mix is formed into standard AFS tensile strength samples using the standard procedure. The tensile strength of the test bars and core hardness are set forth below in Table I. The composition has a work time of about 18 minutes and a strip time of about 55 minutes.

EXAMPLE 4

Example 1 is repeated except that 165 parts of the boronated aluminum phosphate without any gluconic acid are employed. The resulting foundry mix is formed into standard AFS tensile strength samples using the standard procedure. The tensile strength of the test bars and core hardness are set forth in Table I below. The composition has a work time of about 14 minutes and a strip time of about 40 minutes.

Table I

|  | Example 1 | | Example 2 | |
|---|---|---|---|---|
| % gluconic acid based upon total of gluconic acid and aluminum phosphate solution | 4.25 | | 6.25 | |
| Work time (minutes) | 19 | | 23 | |
| Strip time (minutes) | 62 | | 58 | |
| Time (hours) | Tensile strength psi | Core hardness | Tensile strength psi | Core hardness |
| 2 | 95 | 88 | 100 | 90 |
| 4 | 160 | 90 | | |
| 6 | 220 | 91 | | |
| 24 | 200 | 90 | 240 | 89 |
| 48 | 245 | 88 | 215 | 88 |
| 72 | 150 | 92 | 235 | 91 |

Table I-continued

|  | Example 3 | | Example 4 | |
|---|---|---|---|---|
| % gluconic acid based upon total of gluconic acid and aluminum phosphate solution | 10 | | 0 | |
| Work time (minutes) | 18 | | 14 | |
| Strip time (minutes) | 55 | | 40 | |
| Time (hours) | Tensile strength psi | Core hardness | Tensile strength psi | Core hardness |
| 2 | 105 | 91 | 130 | 35 |
| 4 | 160 | 91 | 190 | 90 |
| 6 | 205 | 91 | 215 | 85 |
| 24 | 220 | 92 | 85 | 72 |
| 48 | 250 | 90 | 110 | 67 |
| 72 | 225 | 86 | 90 | 74 |

EXAMPLE 5

5000 parts of Port Crescent Lake sand and about 25 parts of a mixture of magnesium oxide having a surface area of about 2.3 m$^2$/gram (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 8.35 parts of d-tartaric acid. The mixture is then agitated for 2 minutes.

The resulting foundry mix is formed into standard AFS tensile strength samples using the standard procedure. The tensile strength of the test bars and core hardness are set forth below in Table II. The composition has a work time of about 16 minutes and a strip time of about 52 minutes.

EXAMPLE 6

Example 5 is repeated except that about 13.5 parts of d-tartaric acid and about 151.5 parts of the boronated aluminum phosphate are employed. The resulting foundry mix is formed into standard AFS tensile strength samples using the standard procedure. The tensile strength of the test bars and core hardness are set forth below in Table II. The composition has a work time of about 15 minutes and a strip time of about 51 minutes.

EXAMPLE 7

Example 5 is repeated escept that about 2 parts of d-tartaric acid and about 163 parts of the boronated aluminum phosphate are employed. The resulting foundry mix is formed into standard AFS tensile strength samples using the standard procedure. The tensile strength of the test bars and core hardness are set forth below in Table II. The composition has a work time of about 16 minutes and a strip time of about 58 minutes.

EXAMPLE 8

Example 5 is repeated except that about 4 parts of d-tartaric acid and about 161 parts of the boronated aluminum phosphate are employed. The resulting foundry mix is formed into standard AFS tensile strength samples using the standard procedure. The tensile strength of the test bars and core hardness are set forth below in Table II. The composition has a work time of about 15 minutes and a strip time of about 42 minutes.

EXAMPLE 9

Example 5 is repeated except that 165 parts of the boronated aluminum phosphate without any d-tartaric acid are employed. The resulting foundry mix is formed into standard AFS tensile strength samples using the standard procedure. The tensile strength of the test bars and core hardness are set forth below in Table II. The composition has a work time of about 14 minutes and a strip time of about 40 minutes.

Table II

|  | Example 5 | Example 6 |
| --- | --- | --- |
| % d-tartaric acid based upon total of d-tartaric acid and aluminum phosphate solution | 5.06 | 8.2 |
| Work time (minutes) | 16 | 15 |
| Strip time (minutes) | 52 | 51 |

| Time (hours) | Tensile strength psi | Core hardness | Tensile strength psi | Core hardness |
| --- | --- | --- | --- | --- |
| 2 | 130 | 94 | 145 | 89 |
| 4 | 165 | 92 |  |  |
| 6 | 195 | 91 |  |  |
| 24 | 270 | 91 | 260 | 86 |
| 48 | 220 | 88 | 225 | 85 |
| 72 | 195 | 86 | 215 | 88 |

|  | Example 7 | Example 8 |
| --- | --- | --- |
| % d-tartaric acid based upon total of d-tartaric acid and aluminum phosphate solution | 1.2 | 2.43 |
| Work time (minutes) | 16 | 15 |
| Strip time (minutes) | 58 | 42 |

| Time (hours) | Tensile strength psi | Core hardness | Tensile strength psi | Core hardness |
| --- | --- | --- | --- | --- |
| 2 | 150 | 91 | 105 | 90 |
| 4 | 200 | 85 | 180 | 88 |
| 6 | 200 | 85 | 205 | 84 |
| 24 | 260 | 86 |  |  |
| 48 |  |  |  |  |
| 72 | 185 | 85 | 240 | 86 |
| 96 | 195 | 88 | 215 | 85 |
| 120 |  |  | 210 | 88 |

|  | Example 9 |
| --- | --- |
| % d-tartaric acid based upon total of d-tartaric acid and aluminum phosphate solution | 0 |
| Work time (minutes) | 14 |
| Strip time (minutes) | 40 |

| Time (hours) | Tensile strength psi | Core hardness |
| --- | --- | --- |
| 2 | 130 | 95 |
| 4 | 190 | 90 |
| 6 | 215 | 85 |
| 24 | 85 | 72 |
| 48 | 110 | 67 |
| 72 | 90 | 74 |

EXAMPLE 10

5000 parts of Port Crescent Lake sand and about 35 parts of a mixture of magnesium oxide having a surface area of about 2.3 $m^2/gm$ (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 8.35 parts of malonic acid. The mixture is then agitated for 2 minutes.

The resulting foundry mix is formed into standard AFS tensile strength samples using the standard procedure. The tensile strength of the text bars and core hardness are set forth below in Table III. The composition has a work time of about 18 minutes and a strip time of about 58 minutes.

EXAMPLE 11

Example 10 is repeated except that about 16.3 parts of malonic acid and about 148.7 parts of the boronated aluminum phosphate are employed. The resulting foundry mix is formed into standard AFS tensile strength samples using the standard procedure. The tensile strength of the test bars and core hardness are set forth below in Table III. The composition has a work time of about 23 minutes and a strip time of about 77 minutes.

EXAMPLE 12

Example 10 is repeated except that about 2 parts of malonic acid and about 163 parts of the boronated aluminum phosphate are employed. The resulting foundary mix is formed into standard AFS tensile strength samples using the standard procedure. The tensile strength of the text bars and core hardness are set forth below in Table III. The composition has a work time of about 15 minutes and a strip time of about 46 minutes.

EXAMPLE 13

Example 10 is repeated except that about 4 parts of malonic acid and about 161 parts of the boronated aluminum phosphate are employed. The resulting foundry mix is formed into standard AFS tensile strength samples using the standard procedure. The tensile strength of the test bars and core hardness are set forth below in Table III. The composition has a work time of about 17 minutes and a strip time of about 54 minutes.

EXAMPLE 14

Example 10 is repeated except that 165 parts of the boronated aluminum phosphate without any malonic acid are employed. The resulting foundry mix is formed into standard AFS tensile strength samples using the standard procedure. The tensile strength of the test bars and core hardness are set forth below in Table III. The composition has a work time of about 14 minutes and a strip time of about 40 minutes.

Table III

|  | Example 10 | Example 11 |
| --- | --- | --- |
| % malonic acid based upon total of |  |  |

Table III-continued

|  | | |
|---|---|---|
| malonic acid and aluminum phosphate solution | 5.06 | 9.90 |
| Work time (minutes) | 18 | 23 |
| Strip time (minutes) | 58 | 77 |

| Time (hours) | Tensile strength psi | Core hardness | Tensile strength psi | Core hardness |
|---|---|---|---|---|
| 2 | 95 | 84 | 60 | 87 |
| 4 | — | — | — | — |
| 6 | 180 | 86 | 170 | 84 |
| 24 | 145 | 83 | 250 | 83 |
| 48 | 195 | 85 | 175 | 84 |
| 72 | 180 | 91 | 165 | 86 |

|  | Example 12 | Example 13 |
|---|---|---|
| % malonic acid based upon total of malonic acid and aluminum phosphate solution | 1.23 | 2.44 |
| Work time (minutes) | 15 | 17 |
| Strip time (minutes) | 46 | 54 |

| Time (hours) | Tensile strength psi | Core hardness | Tensile strength psi | Core hardness |
|---|---|---|---|---|
| 2 | 145 | 89 | 100 | 85 |
| 4 | — | — | — | — |
| 6 | 155 | 80 | 225 | 82 |
| 24 | 80 | 68 | 80 | 78 |
| 48 | 85 | 76 | 90 | 75 |
| 72 | 100 | 85 | 135 | 80 |

|  | Example 14 |
|---|---|
| % malonic acid based upon total of malonic acid and aluminum phosphate solution | 0 |
| Work time (minutes) | 14 |
| Strip time (minutes) | 40 |

| Time (hours) | Tensile strength psi | Core hardness |
|---|---|---|
| 2 | 130 | 95 |
| 4 | 190 | 90 |
| 6 | 215 | 85 |
| 24 | 155 | 72 |
| 48 | 110 | 67 |
| 72 | 90 | 74 |

EXAMPLE 15

5000 parts of Port Crescent Lake sand and about 35 parts of a mixture of magnesium oxide having a surface area of about 2.3 m²/gm (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 8.35 parts of citric acid. The mixture is then agitated for 2 minutes.

The resulting foundry mix is formed into standard AFS tensile strength samples using the standard procedure. The tensile strength of the test bars and core hardness are set forth below in Table IV. The composition has a work time of about 15 minutes and a strip time of about 54 minutes.

EXAMPLE 16

Example 15 is repeated except that about 16.3 parts of citric acid and about 148.7 parts of the boronated aluminum phosphate are employed. The resulting foundry mix is formed into standard AFS tensile strength samples using the standard procedure. The tensile strength of the text bars and core hardness are set forth below in Table IV. The composition has a work time of about 23 minutes and a strip time of about 71 minutes.

EXAMPLE 17

Example 15 is repeated except that about 2 parts of citric acid and about 163 parts of the boronated aluminum phosphate are employed. The resulting foundry mix is formed into standard AFS tensile strength samples using the standard procedure. The tensile strength of the test bars and core hardness are set forth below in Table IV. The composition has a work time of about 18 minutes and a strip time of about 53 minutes.

EXAMPLE 18

Example 15 is repeated except that about 4 parts of citric acid and about 161 parts of the boronated aluminum phosphate are employed. The resulting foundry mix is formed into standard AFS tensile strength samples using the standard procedure. The tensile strength of the test bars and core hardness are set forth below in Table IV. The composition has a work time of about 18 minutes and a strip time of about 53 minutes.

EXAMPLE 19

Example 15 is repeated except that 165 parts of the boronated aluminum phosphate without any citric acid are employed. The resulting foundry mix is formed into standard AFS tensile strength samples using the standard procedure. The tensile strength of the test bars and core hardness are set forth below in Table IV. The composition has a work time of about 14 minutes and a strip time of about 40 minutes.

Table IV

|  | Example 15 | Example 16 |
|---|---|---|
| % citric acid based upon total amount of citric acid and aluminum phosphate | 5.06 | 9.90 |
| Work time (minutes) | 15 | 23 |
| Strip time (minutes) | 54 | 71 |

| Time (hours) | Tensile strength psi | Core hardness | Tensile strength psi | Core hardness |
|---|---|---|---|---|
| 2 | — | — | 75 | 86 |
| 4 | 165 | 78 | 155 | 82 |
| 6 | 190 | 81 | — | — |
| 24 | — | — | 225 | 79 |
| 48 | — | — | 210 | 80 |
| 72 | 240 | 92 | 220 | 75 |
| 96 | 250 | 75 | 255 | 84 |
| 120 | 215 | 80 | — | — |

|  | Example 17 | Example 18 |
|---|---|---|
| % citric acid based upon total amount of citric acid and aluminum phosphate | 1.23 | 2.44 |
| Work time (minutes) | 18 | 17 |
| Strip time (minutes) | 53 | 48 |

Table IV-continued

| Time (hours) | Tensile strength psi | Core hardness | Tensile strength psi | Core hardness |
|---|---|---|---|---|
| 2 | 95 | 83 | 115 | 80 |
| 4 | 180 | 80 | 210 | 77 |
| 6 | 205 | 79 | 225 | 81 |
| 24 | 235 | 80 | 220 | 79 |
| 48 | 225 | 82 | 205 | 81 |
| 72 | — | — | — | — |
| 96 | 220 | 81 | 220 | 85 |
| 120 | — | — | — | — |

|  | Example 19 |
|---|---|
| % citric acid based upon total amount of citric acid and aluminum phosphate | 0 |
| Work time (minutes) | 14 |
| Strip time (minutes) | 40 |

| Time (hours) | Tensile strength psi | Core hardness |
|---|---|---|
| 2 | 130 | 95 |
| 4 | 190 | 90 |
| 6 | 215 | 85 |
| 24 | 85 | 72 |
| 48 | 110 | 67 |
| 72 | 90 | 74 |
| 96 | — | — |
| 120 | — | — |

EXAMPLE 20

5000 parts of Port Crescent Lake sand and about 35 parts of a mixture of magnesium oxide having a surface area of about 2.3 m$^2$/gm (Magmaster 1-A) and calcium aluminate (Refcon) in a ratio of 5 parts of magnesium oxide to 1 part of calcium aluminate are admixed for about 2 minutes. To this mixture are added a mixture of about 156.65 parts of an aluminum phosphate prepared along the lines of the procedure in Example 1 and having a solids content of 66.6%, viscosity of 700-750 centipoises, mole ratio of phosphorus to total moles of aluminum and boron of 3:1, about 20 mole % boron based upon the moles of aluminum, pH of 1.5-2.0 and Gardner color of 2, and about 8.35 parts of oxalic acid. The mixture is then agitated for 2 minutes.

The resulting foundry mix is formed into standard AFS tensile strength samples using the standard procedure. The tensile strength of the test bars and core hardness are set forth below in Table V. The composition has a work time of about 17 minutes and a strip time of about 60 minutes.

EXAMPLE 21

Example 20 is repeated except that about 16.3 parts of oxalic acid and about 148.7 parts of the boronated aluminum phosphate are employed. The resulting foundry mix is formed into standard AFS tensile strength samples using the standard procedure. The tensile strength of the test bars and core hardness are set forth below in Table V. The composition has a work time of about 26 minutes and a strip time of about 75 minutes.

EXAMPLE 22

Example 20 is repeated except that about 2 parts of oxalic acid and about 163 parts of the boronated aluminum phosphate are employed. The resulting foundry mix is formed into standard AFS tensile strength samples using the standard procedure. The tensile strength of the test bars and core hardness are set forth below in Table V. The composition has a work time of about 17 minutes and a strip time of about 52 minutes.

EXAMPLE 23

Example 20 is repeated except that about 4 parts of oxalic acid and about 161 parts of the boronated aluminum phosphate are employed. The resulting foundry mix is formed into standard AFS tensile strength samples using the standard procedure. The tensile strength of the test bars and core hardness are set forth below in Table V. The composition has a work time of about 19 minutes and a strip time of about 51 minutes.

EXAMPLE 24

Example 20 is repeated except that 165 parts of the boronated aluminum phosphate without any oxalic acid are employed. The resulting foundry mix is formed into standard AFS tensile strength samples using the standard procedure. The tensile strength of the test bars and core hardness are set forth below in Table V. The composition has a work time of about 14 minutes and a strip time of about 40 minutes.

Table V

|  | Example 20 | Example 21 |
|---|---|---|
| % oxalic acid based upon total amount of oxalic acid and aluminum phosphate | 5.06 | 9.90 |
| Work time (minutes) | 17 | 26 |
| Strip time (minutes) | 60 | 75 |

| Time (hours) | Tensile strength psi | Core hardness | Tensile strength psi | Core hardness |
|---|---|---|---|---|
| 2 | 115 | 81 | 70 | 84 |
| 4 | 155 | 84 | 145 | 85 |
| 6 | 230 | 88 | — | — |
| 24 | 285 | 86 | 250 | 81 |
| 48 | 300 | 85 | 245 | 79 |
| 72 | — | — | 220 | 82 |
| 96 | — | — | 230 | 84 |
| 120 | — | — | — | — |

|  | Example 22 | Example 23 |
|---|---|---|
| % oxalic acid based upon total amount of oxalic acid and aluminum phosphate | 1.23 | 2.44 |
| Work time (minutes) | 17 | 19 |
| Strip time (minutes) | 52 | 51 |

| Time (hours) | Tensile strength psi | Core hardness | Tensile strength psi | Core hardness |
|---|---|---|---|---|
| 2 | 105 | 79 | 100 | 79 |
| 4 | — | — | 145 | 85 |
| 6 | — | — | — | — |
| 24 | 190 | 74 | 215 | 83 |
| 48 | 210 | 86 | 210 | 81 |
| 72 | — | — | — | — |
| 96 | 250 | 83 | 230 | 83 |
| 120 | 230 | 84 | 200 | 85 |

|  | Example 24 |
|---|---|
| % oxalic acid based upon total amount of oxalic acid and aluminum phosphate | 0 |
| Work time (minutes) | 14 |
| Strip time (minutes) | 40 |

| | Tensile | Core |

Table V-continued

| Time (hours) | strength psi | hardness |
|---|---|---|
| 2 | 130 | 95 |
| 4 | 190 | 90 |
| 6 | 215 | 85 |
| 24 | 85 | 72 |
| 48 | 110 | 67 |
| 72 | 90 | 74 |
| 96 | — | — |
| 120 | — | — |

EXAMPLE 25

To a reaction vessel equipped with a stirrer, thermometer, and reflux condenser are added about 2445 parts of 85% phosphoric acid. Then about 67 parts of sodium borate are added with agitation, and the agitation is continued for about 10 minutes until the borate dissolves in the acid to form a clear solution. To this solution are added about 540 parts of hydrated alumina (Alcoa C-33) under agitation. The reaction proceeds for about 40 minutes with the temperature rising to a maximum of about 220° F due to the reaction exotherm. Then external heat is applied and reaction temperature rises to a maximum of about 245° F. The reaction mass is held at about 245° F for about 2 hours to ensure complete reaction. The reaction mass is then cooled to room temperature and about 3052 parts of a boronated aluminum phosphate having a solids content of about 75%, a viscosity of about 40,000 centipoises, a mole ratio of phosphorus to total moles of aluminum and boron of 3:1 and about 10 mole % boron based upon the moles of aluminum are obtained. This aluminum phosphate is diluted with water to provide a solids content of about 66% and having a viscosity of 400–500 centipoises.

5000 parts of Port Crescent Lake sand and about 30.5 parts of a mixture of magnesium oxide (Magmaster 1-A) and a calcium aluminate containing 58% $Al_2O_3$ and 33% CaO (Refcon) in a ratio of 5 parts of magnesium oxide to 1 part of calcium aluminate are mixed for about 2 minutes. To this mixture are added a mixture of about 156.6 parts of the 66% solids solution of the boronated aluminum phosphate prepared above and about 8.4 parts of d-tartaric acid. The mixture is then agitated for 2 minutes. The resulting foundry mix is formed by hand ramming into standard AFS tensile strength samples using the standard procedure. The tensile strength of the test bars and core hardness are set forth below in Table VI. The composition has a work time of about 11 minutes and a strip time of about 32 minutes.

EXAMPLE 26

Example 25 is repeated except that 165 parts of the boronated aluminum phosphate without any organic carboxylic acid are employed. The resulting foundry mix is formed into standard AFS tensile strength samples using the standard procedure. The tensile strength of the test bars and core hardness are set forth below in Table VI. The composition has a work time of about 13 minutes and a strip time of about 42 minutes.

Table VI

|  | Example 25 | Example 26 |
|---|---|---|
|  | 5.1% tartaric acid | 0% organic carboxylic acid |
| Work time (minutes) | 11 | 13 |
| Strip time (minutes) | 32 | 42 |

Table VI-continued

|  | Tensile strength psi | Core hardness | Tensile strength psi | Core hardness |
| Time hours |  |  |  |  |
|---|---|---|---|---|
| 2 | 115 | 72 | 125 | 75 |
| 4 | 145 | — | 165 | 72 |
| 6 | — | — | 160 | 74 |
| 24 | 110 | 65 | 120 | 65 |
| 48 | 110 | 76 | — | — |

EXAMPLE 27

Example 25 is repeated except that a boronated aluminum phosphate containing 20 mole % boron and 20 mole % sodium based upon the aluminum and prepared according to the procedure of Example 25 is employed. The resulting foundry mix is formed by hand ramming into standard AFS tensile strength samples using the standard procedure. The tensile strength of the test bars and core hardness are set forth below in Table VII. The composition has a work time of about 12 minutes and a strip time of about 30 minutes.

EXAMPLE 28

Example 27 is repeated except that 165 parts of the boronated aluminum phosphate without any organic carboxylic acid are employed. The resulting foundry mix is formed into standard AFS tensile strength samples using the standard procedure. The tensile strength of the test bars and core hardness are set forth below in Table VII. The composition has a work time of about 15 minutes and a strip time of about 38 minutes.

Table VII

|  | Example 27 | Example 28 |
|---|---|---|
|  | 5.1% tartaric acid | 0% organic carboxylic acid |
| Work time (minutes) | 12 | 15 |
| Strip time (minutes) | 30 | 38 |

| Time hours | Tensile strength psi | Core hardness | Tensile strength psi | Core hardness |
|---|---|---|---|---|
| 2 | 105 | 74 | 100 | 58 |
| 4 | 150 | 69 | 155 | 77 |
| 6 | 170 | 78 | 110 | 50 |
| 24 | 185 | 67 | 65 | 32 |
| 48 | 155 | 68 | — | — |

A comparison of Examples 1–3 with 4, Examples 5–8 with 9, Examples 10–13 with 14, Examples 15–18 with 19, Examples 20–23 with 24, Example 25 with 26, and Example 27 with 28 demonstrates that after storage for several hours, the general trend is improvement in physical properties such as tensile strength and core hardness due to the presence of the type of organic carboxylic acids employed in the present invention, although a few of the samples do not fit the general behavior due to some normal experimental error. Although the systems of the present invention may not possess as great initial physical properties as those corresponding systems which do not include the organic carboxylic acids, the higher physical properties after storage for several hours is quite important from a practical and commercial viewpoint.

The following Examples 29–33 demonstrate that the use of organic carboxylic acids outside the scope of the present invention does not result in the type of improved tensile strengths as is obtained by practicing the present invention.

EXAMPLE 29

3000 parts of Port Crescent Lake sand and about 20 parts of a mixture of magnesium oxide having a surface area of about 2.3 m²/gm (Magmaster 1-A) and calcium aluminate (Refcon) in a ratio of 5 parts of magnesium oxide to 1 part of calcium aluminate are admixed for about 2 minutes. To this mixture are added a mixture of about 94.1 parts of an aluminum phosphate prepared along the lines of the procedure in Example 1 and having a solids content of 66.6%, viscosity of 700–750 centipoises, mole ratio of phosphorus to total moles of aluminum and boron of 3:1, about 20 mole % boron based upon the moles of aluminum, pH of 1.5–2.0 and Gardner color of 2, and about 1.9 parts of acetic acid. The mixture is then agitated for 2 minutes.

The resulting foundry mix is formed into standard AFS tensile strength samples using the standard procedure. The tensile strength of the test bars and core hardness are set forth below in Table VIII.

EXAMPLE 30

Example 29 is repeated except that about 4.8 parts of acetic acid and about 9.12 parts of the boronated aluminum phosphate are employed. The resulting foundry mix is formed into standard AFS tensile strength samples using the standard procedure. The tensile strength of the test bars and core hardness are set forth below in Table VIII.

EXAMPLE 31

Example 29 is repeated except that about 7.7 parts of acetic acid and about 88.3 parts of the boronated aluminum phosphate are employed. The resulting foundry mix is formed into standard AFS tensile strength samples using the standard procedure. The tensile strength of the test bars and core hardness are set forth below in Table VIII.

EXAMPLE 32

Example 29 is repeated except that about 9.6 parts of acetic acid and about 86.4 parts of the boronated aluminum phosphate are employed. The resulting foundry mix is formed into standard AFS tensile strength samples using the standard procedure. The tensile strength of the test bars and core hardness are set forth below in Table VIII.

EXAMPLE 33

Example 29 is repeated except that 96 parts of the boronated aluminum phosphate without any acetic acid are employed. The resulting foundry mix is formed into standard AFS tensile strength samples using the standard procedure. The tensile strength of the test bars and core hardness are set forth below in Table VIII.

Table VIII

| | Example 29 | | Example 30 | |
|---|---|---|---|---|
| % acetic acid based upon total weight of acetic acid and aluminum phosphate solution | 2 | | 5 | |
| Hours | Tensile strength psi | Core hardness | Tensile strength psi | Core hardness |
| 2 | 75 | 71 | 70 | 62 |
| 2 | 85 | 69 | 65 | 62 |
| 3 | 95 | 68 | 100 | 73 |
| 3 | 105 | 74 | 105 | 70 |
| 72* | | | | |

Table VIII-continued

| | Example 31 | | Example 32 | |
|---|---|---|---|---|
| % acetic acid based upon total weight of acetic acid and aluminum phosphate solution | 8 | | 10 | |
| Hours | Tensile strength psi | Core hardness | Tensile strength psi | Core hardness |
| 2 | 65 | 70 | 40 | 80 |
| 2 | 60 | 63 | 55 | 85 |
| 3 | 85 | 72 | 65 | 50 |
| 3 | 90 | 71 | 75 | 57 |
| 72* | | | | |

| | Example 33 | |
|---|---|---|
| % acetic acid based upon total weight of acetic acid and aluminum phosphate solution | 0 | |
| Hours | Tensile strength psi | Core hardness |
| 2 | 105 | 72 |
| 2 | 90 | 80 |
| 3 | 100 | 74 |
| 3 | 105 | 74 |
| 72* | 90 | 69 |

*At 72 hours all samples containing acetic acid were very fragile and could not be measured for tensile strength and core hardness.

What is claimed is:

1. Process for preparing settable composition comprising:
   (A) providing aluminum phsophate;
   (B) providing solid organic carboxylic acid;
   (C) providing oxygen-containing alkaline earth compound;
   (D) providing water; and
   (E) admixing said aluminum phosphate, said solid organic carboxylic acid, said alkaline earth material, and water provided that said solid organic carboxylic acid and said alkaline earth material are not precontacted with each other prior to contact of the alkaline earth material with the aluminum phosphate; and
   (F) wherein said aluminum phosphate contains 0 to about 40 mole % of boron based upon the moles of aluminum and contains a mole ratio of phosphorus to total moles of aluminum and boron of at least about 2:1;
   (G) said solid organic carboxylic acid being soluble in aqueous solutions of the aluminum phosphate and containing at least two substituents selected from the group consisting of at lease two carboxylic acid groups; and at lease one carboxylic acid group, and at least one hydroxyl group, or keto tautomers thereof;
   (H) said alkaline earth metal compound contains alkaline earth metal and an oxide; and is capable of reacting with the aluminum phosphate; and
   (I) wherein the amount of aluminum phosphate is from about 50 to about 95% by weight based upon the total weight of aluminum phosphate and alkaline earth compound; the amount of alkaline earth compound is from about 50 to about 5% by weight based upon the total weight of aluminum phosphate and alkaline earth compound; the amount of water is from about 15 to about 50% by weight based upon the total weight of aluminum phosphate and water; and the amount of said acid is from about 0.5 to about 25% by weight based upon the total weight of aluminum phosphate, and acid.

2. The process of claim 1 wherein said aluminum phosphate contains boron in an amount from about 3 to about 40 mole % based upon the moles of aluminum.

3. The process of claim 1 wherein said aluminum phosphate contains boron in an amount from about 5 to about 30 mole % based upon the moles of aluminum.

4. The process of claim 1 wherein said aluminum phosphate contains boron in an amount from about 10 to about 25 mole % based upon the moles of aluminum.

5. The process of claim 1 wherein the aluminum phosphate contains a mole ratio of phosphorus to total moles of aluminum and boron of from about 2.5:1 to about 3.5:1.

6. The process of claim 1 wherein the aluminum phosphate contains a mole ratio of phosphorus to total moles of aluminum and boron of from about 2.8:1 to about 3.2:1.

7. The process of claim 1 wherein said aluminum phosphate contains boron in an amount between about 10 and about 25 mole % based upon the moles of aluminum, and wherein the mole ratio of phosphorus to total moles of aluminum and boron is between about 2.8:1 to about 3.2:1.

8. The process of claim 1 wherein the amount of said aluminum phosphate is from about 65 to about 90% by weight based upon the total weight of aluminum phosphate and alkaline earth compound, and the amount of alkaline earth compound is from about 10 to about 35% by weight based upon the total weight of aluminum phosphate and alkaline earth compound.

9. The process of claim 1 wherein said solid organic carboxylic acid contains 2 to about 20 carbon atoms.

10. The process of claim 1 wherein said solid organic carboxylic acid contains from about 2 to about 10 carbon atoms.

11. The process of claim 1 wherein said organic carboxylic acid contains from about 2 to about 20 reactive groups.

12. The process of claim 1 wherein said organic carboxylic acid is selected from the group consisting of tartaric acid, gluconic acid, oxalic acid, citric acid, malonic acid, lactic acid, and mixtures thereof.

13. The process of claim 1 wherein said solid organic carboxylic acid is tartaric acid.

14. The process of claim 1 wherein said solid organic carboxylic acid is gluconic acid.

15. The process of claim 1 wherein the amount of organic carboxylic acid is from about 2 to about 15% by weight based upon the total weight of the aluminum phosphate and organic carboxylic acid.

16. The process of claim 1 wherein said alkaline earth compound includes a free alkaline earth metal oxide or a free alkaline earth metal hydroxide and wherein said oxide or hydroxide has a surface area no greater than about 8.5 m$^2$/gram (measured by the BET procedure).

17. The process of claim 16 wherein said alkaline earth metal oxide of free alkaline earth metal hydroxide has a surface area no greater than about 3 m$^2$/gram.

18. The process of claim 1 wherein said alkaline earth metal compound is a mixture of a free alkaline earth metal oxide and a material which contains the alkaline earth metal and oxide in combination with another constituent and wherein said alkaline earth compound has a surface area no greater than about 8.5 m$^2$/gram.

19. The process of claim 18 wherein said alkaline earth metal oxide is magnesium oxide.

20. The process of claim 18 wherein said mixture contains from about 2 to about 8 parts by weight of the free alkaline earth metal oxide per part by weight of the material containing another constituent in combination with the free metal oxide and/or hydroxide and alkaline earth metal.

21. The process of claim 1 wherein the amount of water is from about 20 to about 40% by weight based upon the total weight of the aluminum phosphate and water.

22. A settable composition comprising:
(A) aluminum phosphate containing 0 to about 40 mole % of boron based upon the moles of aluminum and containing a mole ratio of phosphorus to total moles of aluminum and boron of at least about 2:1;
(B) solid organic carboxylic acid being soluble in aqueous solutions of the aluminum phosphate and containing at least two substituents selected from the group consisting of at least two carboxylic acid groups; and at least one carboxylic acid group and at least one hydroxyl group; or keto derivatives thereof;
(C) oxygen-containing alkaline earth compound containing alkaline earth metal and an oxide; and being capable of reacting with said aluminum phosphate; and
(D) water; and wherein the amount of the alkaline earth compound is from about 50 to about 5% by weight based upon the total weight of the aluminum phosphate and alkaline earth compound; the amount of the aluminum phosphate is from about 95 to about 50% by weight based upon the total weight of the aluminum phosphate and alkaline earth compound; the amount of water is from about 15 to about 50% by weight based upon the total weight of the aluminum phosphate and water; and the amount of the solid organic carboxylic acid is from about 0.5 to about 25% by weight based upon the total weight of aluminum phosphate and acid; and wherein said composition is obtained by providing an admixture of said aluminum phosphate, said solid organic carboxylic acid, said alkaline earth material, and said water wherein the solid organic carboxylic acid and alkaline earth material are not precontacted with each other prior to contact of the alkaline earth material with the aluminum phosphate.

23. Molding composition which comprises:
(A) a major amount of aggregate; and
(B) an effective bonding amount up to about 40% by weight of the aggregate of the composition of claim 22.

24. The process of claim 1 wherein said solid organic carboxylic acid is oxalic acid.

25. The process of claim 1 wherein said solid organic carboxylic acid is citric acid.

26. The process of claim 1 wherein said solid organic carboxylic acid is malonic acid.

27. The process of claim 1 wherein said solid organic carboxylic acid is lactic acid.

28. The process of claim 2 wherein said solid organic carboxylic acid is tartaric acid.

29. The process of claim 2 wherein said solid organic carboxylic acid is gluconic acid.

30. The process of claim 2 wherein said solid organic carboxylic acid is oxalic acid.

31. The process of claim 2 wherein said solid organic carboxylic acid is citric acid.

32. The process of claim 2 wherein said solid organic carboxylic acid is malonic acid.

33. The process of claim 2 wherein said solid organic carboxylic acid is lactic acid.

34. The process of claim 2 wherein said organic carboxylic acid is selected from the group consisting of tartaric acid, gluconic acid, oxalic acid, citric acid, malonic acid, lactic acid, and mixtures thereof.

* * * * *

UNITED STATES PATENT AND TRADEMARK OFFICE
CERTIFICATE OF CORRECTION

PATENT NO. : 4,089,692
DATED : May 16, 1978
INVENTOR(S) : Richard H. Toeniskoetter, John J. Spiwak It is certified that error appears in the above-identified patent and that said Letters Patent are hereby corrected as shown below:

In column 25, line 24 delete "9.12" and substitute therefor-----
91.2----so that line 24 reads "acetic acid and about 91.2 parts......."

Signed and Sealed this

Tenth Day of June 1980

[SEAL]

Attest:

SIDNEY A. DIAMOND

Attesting Officer

Commissioner of Patents and Trademarks